Figure 1:
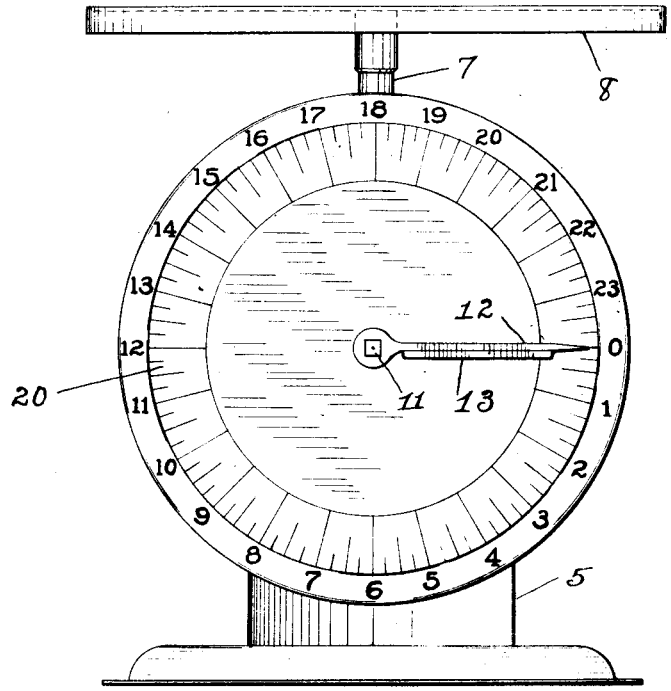

F. REICHMANN.
SPRING BALANCE SCALE.
APPLICATION FILED AUG. 7, 1913.

1,138,687.

Patented May 11, 1915.
2 SHEETS—SHEET 1.

Witnesses:

Inventor
Fritz Reichmann,
By
Frank C. Curtis,
Attorney.

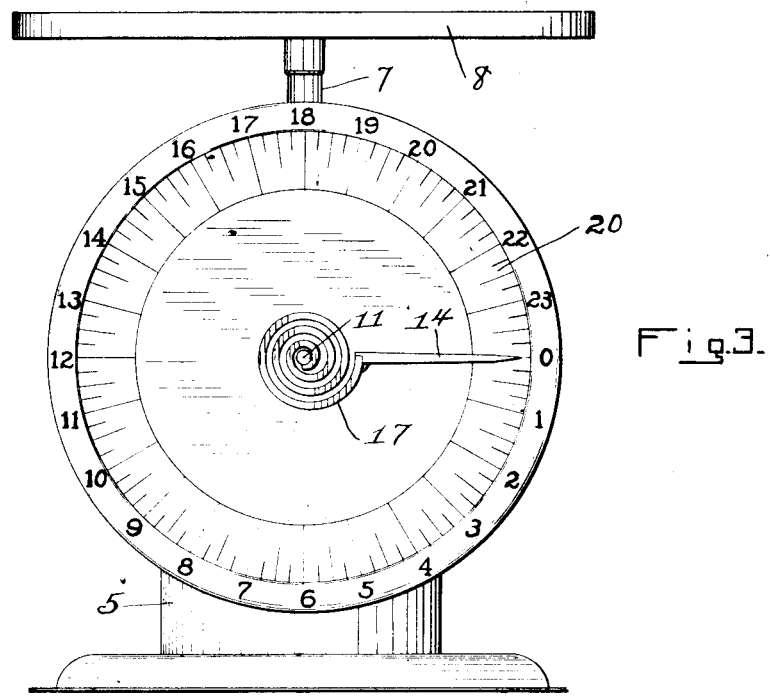
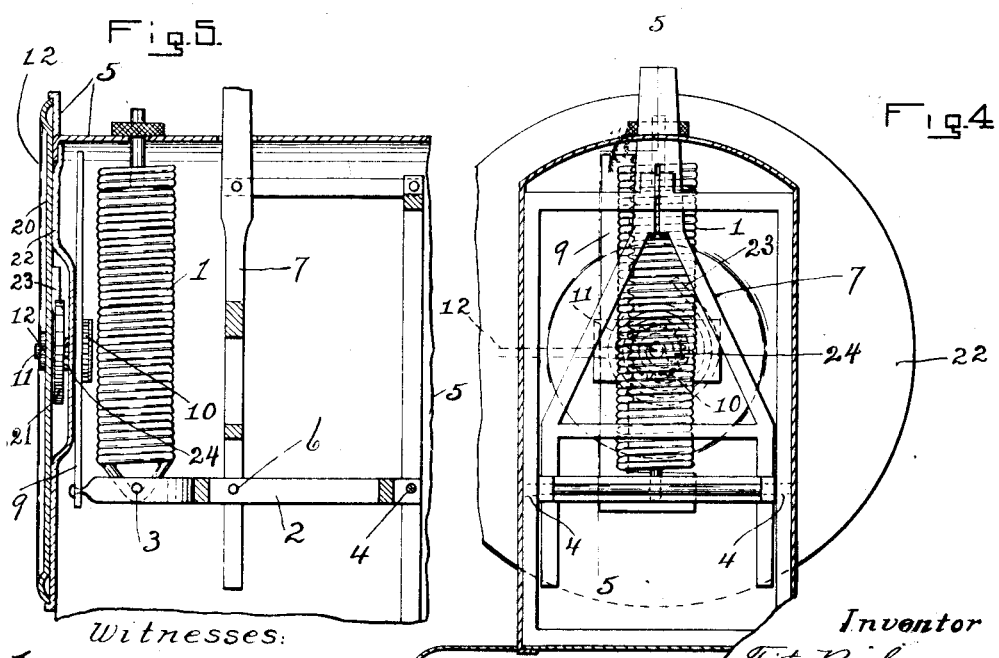

UNITED STATES PATENT OFFICE.

FRITZ REICHMANN, OF ALBANY, NEW YORK.

SPRING-BALANCE SCALE.

1,138,687.   Specification of Letters Patent.   Patented May 11, 1915.

Application filed August 7, 1913. Serial No. 783,550.

*To all whom it may concern:*

Be it known that I, FRITZ REICHMANN, a citizen of the United States, residing at Albany, county of Albany, and State of New York, have invented certain new and useful Improvements in Spring-Balance Scales, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 2:
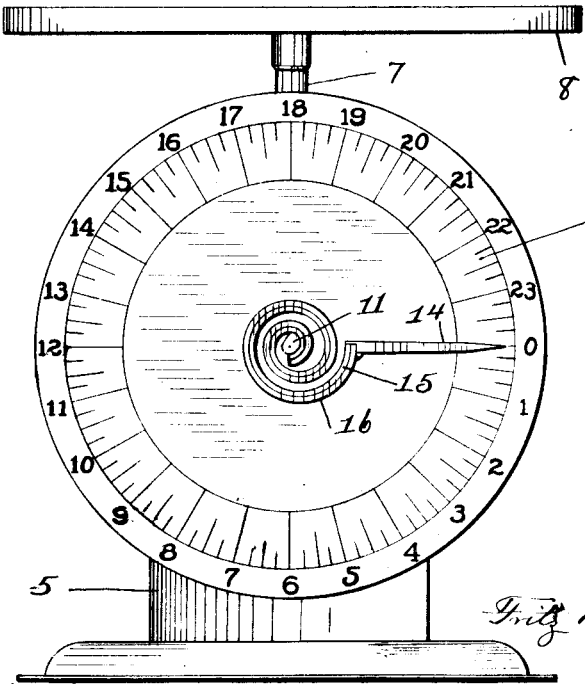

Figure 1 of the drawings is a view in elevation, partly broken away, of a spring-balance scale embodying my invention. Fig. 2 is a similar view showing a different form of the invention. Fig. 3 is a similar view showing another form of the invention. Fig. 4 is a view partly in vertical cross-section and partly in elevation, of the front portion of the scale viewed from the interior or rear, showing another form of the invention. Fig. 5 is a cross-section taken on the broken line 5—5 in Fig. 4.

Spring-balance scales are found to be inaccurate in their indications of weight under different temperature conditions due to the lengthening under increasing temperature of the load-supporting spring by expansion of the metal of which the spring is formed, and shortening of the spring by contraction of its metal under decreasing temperature.

When the scale has been adjusted so that its index stands at zero at normal temperature with no load, thermotic expansion of the spring will tend to shift the index to one side of zero, and thermotic contraction of the spring will tend to shift the index to the other side of zero, so that in either case the weight of a load placed upon the scale will be inaccurately indicated by the index.

Efforts have been made to offset or compensate for such thermotic variation by the use of thermostatic mechanism, whereby the leverage through which the movement of the spring is transmitted to the indicating mechanism is automatically varied in accordance with temperature variations; but a quite cumbersome and powerful apparatus is required to shift the fulcrums or bearing points of such levers, particularly when the scale is under load.

The principal object of my invention is to automatically compensate for thermotic variation in the length of the load-supporting spring by directly shifting one of the members of the indicating mechanism thermostatically.

I have shown my invention applied to an ordinary form of spring-balance scale wherein the load is supported by a coil-spring, 1, by means of a lever, 2, connected with the lower end of the spring at, 3, and fulcrumed at, 4, upon the case or body, 5, of the scale, said lever, 2, being pivotally connected at, 6, with a vertically extending frame, 7, upon the upper end of which is fixed the platform, 8, upon which the load is placed.

The movement of the spring is transmitted by means of a toothed-rack, 9, to a pinion, 10, fixed upon a rotary index-shaft, 11, which extends outward through the dial, 20.

An index mounted upon the outer end of the index-shaft, 11, serves to indicate the weight in connection with a graduated scale on the dial.

As shown in Fig. 1, I attach to one side of the index, 12, by brazing or soldering, a bar, 13, of metal having a different coefficient of expansion from the metal of which the index is made, and adapted, when thermotically expanded or contracted, to bend or control the form of the index to cause the outer end of the index to shift in one direction or the other to compensate for thermotic variation in the length of the load-supporting spring 1.

As shown in Fig. 2, the thermostatic compensating element is in the form of a helical-coil interposed between the outer end, 14, of the index and the index-supporting shaft, 11, said helical-coil being composed of two strips, 15 and 16, of metal having different coefficients of expansion, which straps are brazed together.

As shown in Fig. 3, the thermostatic compensating element is in the form of a helical-coil, 17, interposed between the outer end, 14, of the index and the index-supporting shaft, 11, said helical-coil consisting of a single strip of metal of such length and having such coefficient of expansion as will adapt it to offset or compensate for the variation which the load-supporting spring, 1, tends to impart to the index under temperature changes.

In the form of my invention shown in Figs. 4 and 5, the index, 12, is fixed directly upon the index-supporting shaft, 11, and the dial, 20, is pivotally mounted relatively to said index-supporting shaft, 11, and to the case or frame, 5, of the scale; and the thermostatic compensating element is in the form of a helical-coil, 21, one end, 23, of which is attached to the back of the dial, 20, and the other end 24, to a stationary frontplate, 22, of the case or frame, just in rear of the dial.

Thermotic variation in the length of the helical-coil, 21, will serve to slightly rotate the dial in one direction or the other to shift the position of the graduated scale on the dial to compensate for the shifting of the position of the index in response to the thermotic expansion or contraction of the load-supporting spring.

By my invention it is necessary to thermostatically shift only one member of the indicating mechanism which can be shifted as readily under loads as without load, so that a comparatively small and inexpensive thermostatic element may be employed.

While I have shown and described my invention applied to a weighing-scale, it will be understood that it is also applicable to any device wherein indicataing mechanism is actuated by a coil-spring subject to thermotic variations in length.

What I claim as new and desire to secure by Letters Patent is—

1. A spring-balance having indicating mechanism comprising a pair of relatively movable members, one having a graduated scale and the other having an index coöperative with said scale; a weight-actuated shaft operatively connected with one of said members by means including a thermostatic compensating element.

2. In a spring-balance, and in combination, a weight-supporting spring; a rotatory shaft connected with said spring; a shaft-operated index; and a thermostatic compensating element between said shaft and the outer end of said index.

In testimony whereof, I have hereunto set my hand this 30th day of July, 1913.

FRITZ REICHMANN.

Witnesses:
CHARLES S. ALDRICH,
FRANK C. CURTIS